US012494298B2

(12) United States Patent
Belin

(10) Patent No.: US 12,494,298 B2
(45) Date of Patent: Dec. 9, 2025

(54) CONNECTING ASSEMBLY FOR A FLUIDTIGHT TRANSFER CONTAINER

(71) Applicant: GETINGE LIFE SCIENCE FRANCE, Vendome (FR)

(72) Inventor: Jean Belin, Lunay (FR)

(73) Assignee: GETINGE LIFE SCIENCE FRANCE, Vendome (FR)

( * ) Notice: Subject to any disclaimer, the term of this patent is extended or adjusted under 35 U.S.C. 154(b) by 333 days.

(21) Appl. No.: 18/256,759

(22) PCT Filed: Dec. 9, 2021

(86) PCT No.: PCT/FR2021/052256
§ 371 (c)(1),
(2) Date: Jun. 9, 2023

(87) PCT Pub. No.: WO2022/123183
PCT Pub. Date: Jun. 16, 2022

(65) Prior Publication Data
US 2024/0029907 A1 Jan. 25, 2024

(30) Foreign Application Priority Data
Dec. 10, 2020 (FR) ...................................... 2013006

(51) Int. Cl.
*G21F 7/00* (2006.01)
*G21F 5/12* (2006.01)
*G21F 7/005* (2006.01)

(52) U.S. Cl.
CPC ................ *G21F 7/005* (2013.01); *G21F 5/12* (2013.01)

(58) Field of Classification Search
CPC .................................. G21F 7/005; G21F 5/12
See application file for complete search history.

(56) References Cited

U.S. PATENT DOCUMENTS 11,883,815 B2 * 1/2024 Mumm .................... F16J 13/24
2007/0074784 A1 * 4/2007 Giesen ................ B65G 69/183 141/346
2023/0035472 A1 * 2/2023 Felix ....................... G21F 7/005

FOREIGN PATENT DOCUMENTS

| | | | |
|---|---|---|---|
| CN | 1406827 | A | 4/2003 |
| CN | 1282586 | C | 11/2006 |
| CN | 101208249 | B | 6/2008 |
| FR | 2695343 | A1 | 3/1994 |
| TW | 498890 | U | 8/2002 |
| TW | 200710000 | A | 3/2007 |

OTHER PUBLICATIONS

International Search Report for Application No. PCT/FR2021/052256 dated Jun. 15, 2022.
Written Opinion for PCT/FR2021/052256 dated Jun. 15, 2022.

* cited by examiner

*Primary Examiner* — Nicole M Ippolito
(74) *Attorney, Agent, or Firm* — McDonald Hopkins LLC

(57) ABSTRACT

Connecting assembly for a fluidtight transfer container with a fluidtight transfer cell including a cell flange and a cell door, the assembly including a container flange and a container door mounted in the container flange, wherein the container flange includes a first longitudinal connection portion to the cell and a second longitudinal connection portion to a container, the first longitudinal connection portion and the second longitudinal connection portion being connected by a shoulder opposite the container door.

19 Claims, 22 Drawing Sheets

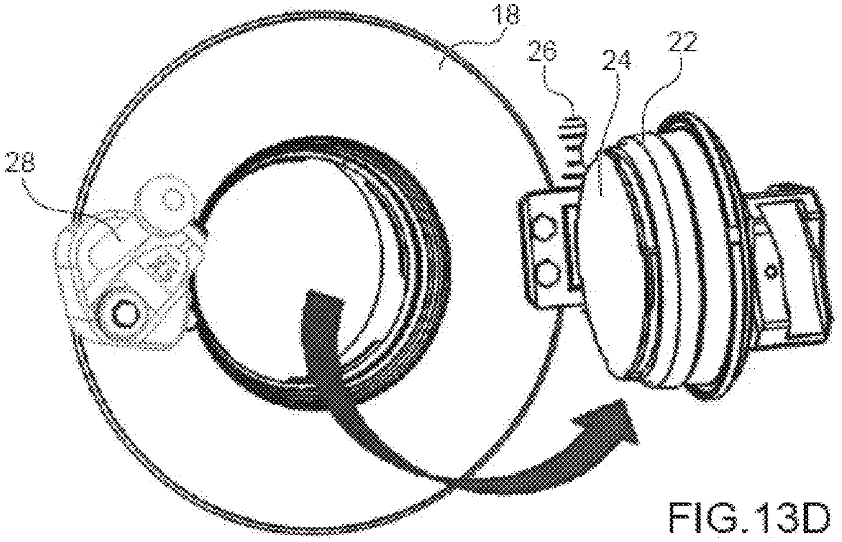
FIG.13D
FIG.14A
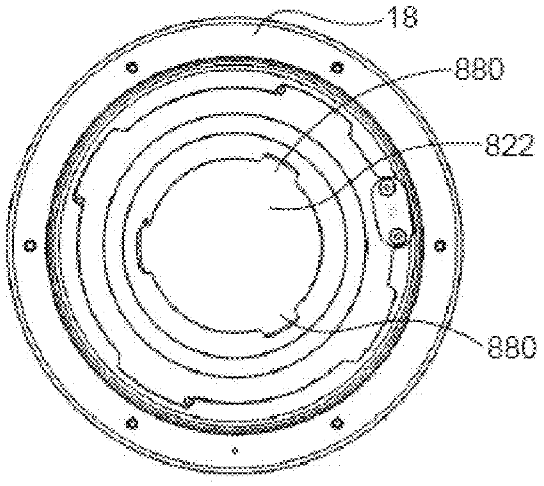

CONNECTING ASSEMBLY FOR A FLUIDTIGHT TRANSFER CONTAINER

This is the National Stage of PCT international application PCT/FR2021/052256, filed on Dec. 9, 2021 entitled "CONNECTION ASSEMBLY FOR A SEALED TRANSFER CONTAINER", which claims the priority of French Patent Application No. 2013006 filed Dec. 10, 2020, both of which are incorporated herein by reference in their entirety.

TECHNICAL FIELD AND PRIOR ART

The present invention relates to a connecting assembly for a fluidtight transfer container and to a container including such a connecting assembly In a certain number of industrial sectors, among which mention will be made of the nuclear, medical, pharmaceutical and agrifood sectors, it is necessary or desirable to perform certain tasks in a confined atmosphere, either to protect the environment, for example from radioactivity, toxicity, etc., or on the contrary to be able to perform these tasks in an aseptic or dust-free atmosphere, or finally both simultaneously.

The transfer of apparatuses or of products from one closed volume to another, without at any time the fluidtightness of each one of these volumes with regards to the exterior being broken, poses a difficult problem to meet. This problem can be resolved by a double-door connection device.

Such a double-door device provided with a multiple safety control is for example known from document FR 2 695 343. Each volume is closed by a door mounted in a flange. Each door is engaged with its flange either via a bayonet connection, or via a hinge and a locking system and the two flanges are intended to be engaged with one another via a bayonet connection.

For example one of the closed volumes is formed by an isolator and the other volume is formed by a flexible container, also designated as a fluidtight transfer bag.

Conventionally the connection portion carried by the isolator is designated as the alpha portion and the connection portion carried by the container is designated as the beta portion.

Seals are provided on the alpha portion and on the beta portion in order to ensure the fluidtightness between the connected volumes.

The beta portion includes a beta flange closed by a beta door, the beta flange and the beta door cooperating with one another via a bayonet connection, and the alpha portion includes an alpha flange closed by an alpha door, the alpha door being articulated on the alpha flange via a hinge. The fluidtightness between the beta flange and the beta door is provided by a seal housed in the beta flange.

The connection between the transfer bag and the enclosure is carried out by mechanical cooperation of the beta flange and of the alpha flange via a connection of the bayonet type. This mechanical cooperation provides both the mechanical engagement and the fluidtightness of the connection.

The fluidtight connection cycle is as follows:

The container carrying the beta portion is brought closer to the alpha portion, the lugs of the beta flange penetrate into notches of the alpha flange, and the lugs of the beta door penetrate into notches of the alpha door. The container is pivoted, for example in the clockwise direction, the lugs of the beta flange pivot and slide in a groove of the alpha flange. Simultaneously, due to the friction of the seal carried by the beta flange, the rotation of the container causes the rotation of the beta door, which causes the connection between the beta door and the alpha door via the bayonet connection. The two doors are then engaged. Each lug of the beta door then bears against a circumferential abutment carried by the alpha door.

The container is again pivoted, due to the bearing of the lugs of the beta door against the circumferential abutments on the alpha door, the rotation of the container causes the disconnection between the beta door and the beta flange.

According to the seals, one carried by the beta flange and the other carried by the alpha door, the following alternative is possible:

Simultaneously to the pivoting and to the sliding of the lugs of the beta flange in a groove of the alpha flange, due to the friction of the seal carried by the alpha door, the beta door is maintained immobile in rotation and the beta door is disconnected from the beta flange. Each lug of the beta flange then bears against a circumferential abutment carried by the beta door.

The container is again pivoted, due to the bearing of the lugs of the beta flange against the circumferential abutments on the beta door, the rotation of the container causes the rotation of the beta door, which causes the connection between the beta door and the alpha door via the bayonet connection. The two doors are then engaged.

From inside the cell, the alpha door is unlocked and the assembly of the two doors can be pivoted towards the inside of the cell about the axis of the hinge.

The transfer between the two volumes can take place.

The disconnection cycle is as follows:

The two doors are set in place in the flanges.

The container is rotated in the anticlockwise direction. Due to the friction between the doors, the beta door remains immobile in rotation, which causes the connection of the beta door and of the beta flange. Then, circumferential abutments carried by the beta flange bear against the circumferential abutments of the beta door, causing the rotation of the beta door in relation to the alpha door and the disconnection thereof. The container is also disconnected from the alpha flange. The container can then be removed from the flange.

The circumferential abutments carried by the beta flange are formed by a circumferential end of the lugs of the beta flange. This results in lugs of large circumferential dimensions, for example the alpha flange includes four lugs, the lugs extending each over an angle of 60°.

The containers, in general flexible bags are usually intended for the sterile transfer of small components such as plugs, syringe pistons, plastic bottles, etc., on the filling lines of the pharmaceutical industry.

The components can jam during the transfer between the container and the cell.

Moreover, in order to protect the ring of contamination, designated "ring of concern", an inner sleeve that is in the container is generally deployed by the operator in the direction of the cell, this sleeve covers the ring of contamination and arranges a channel for the flow of the components. Setting this inner sleeve in place imposes the intervention of an operator from the inside of the cell which, on the one hand, complicates the operations and extends the transfer time, and on the other hand prevents the setting in place of the opening system from the outside, i.e. not requiring the intervention of an operator from inside the cell.

DISCLOSURE OF THE INVENTION

It is consequently a purpose of the present invention to offer a connecting assembly for a fluidtight transfer container, comprising a flange and a door, allowing for a facilitated transfer between the container and a cell.

It is also a purpose of the present invention to offer a connecting assembly for a fluidtight transfer container, comprising a flange and a door, making it possible to overcome the use of an inner sleeve during transfers.

The purposes announced hereinabove are achieved by a connecting assembly for a fluidtight transfer container comprising a flange and a door, the flange includes an integrated chute, the chute being connected to the portion of the flange that ensures the connection to the alpha portion and to the door, by a shoulder oriented towards the beta door. Thus, the container function and the connection function are separated.

The end of a chute which disposed in the cell can then advantageously bear against the shoulder, which will protect the ring of contamination. Furthermore, it isolates the lugs of the flange from components, the risks of jamming are then removed.

It is then no longer necessary to deploy an inner sleeve in the isolator to protect the ring of contamination. The beta flange according to the invention is therefore particularly adapted to the opening of the alpha door by an exterior opening system, whether or not it is motorised, for which the manual operations from the inside of the isolator and the presence of the glove are removed.

On the one hand, when the beta door is closed, the integrated chute with the beta flange and the closed container door form a space with a smooth wall, the components contained in the container cannot be jammed between the flange and the door. On the other hand, when the double door is open, the integrated chute and the chute contained in the isolator that bears against the shoulder of the beta flange form a transfer path that does not include any obstacle. The pouring of components is facilitated.

The dimensions and the shape of the integrated chute depend on the shape and dimensions of the components to be transferred.

According to another aspect, the beta door includes two circumferential abutment sets, an abutment set being actuated during the connection of the container to an alpha portion and the other abutment set being actuated during the disconnection of the container from the alpha portion, the two sets cooperating with the lugs of the flange ensuring the locking of the door on the flange. The angular extension of the lugs of the beta portion can be substantially reduced, for example the angular extension can be 30° instead of 60° in the prior art.

This reduction in the angular extension facilitates the moulding of the flanges carried out via injection and the number of undercuts can be reduced. It then becomes advantageous to carry out the beta flange via injection. A gain in material is obtained.

In the case where the flange does not dissociate the container function and the connection function, the reduction in the angular extension of the lugs makes it possible to limit the risks of components jamming, by substantially increasing the section of passage between the container and the cell.

In other terms, the lugs of the beta flange intended for the connection of the beta door are dimensioned to ensure the engagement of the door on the flange and the abutments are no longer distributed between the flange and the door but are only on the door.

Carrying out the abutments only on the door hardly complicates the manufacturing thereof and, when the beta door is engaged with the alpha door and housed in the cell, the abutments do not hinder the transfer.

The object of the present application is thus a connecting assembly for a fluidtight transfer container with a fluidtight transfer cell including a cell flange and a cell door, said connecting assembly including a container flange and a container door mounted in the container flange, the flange including a first longitudinal connection portion to the cell and a second longitudinal connection portion to a container, the first longitudinal connection portion and the second longitudinal connection portion being connected by a shoulder oriented towards the container door.

Advantageously, the second longitudinal portion forms a chute integrated into the container flange.

Preferably, the assembly includes an annular seal between the shoulder and a face of the container door opposite the shoulder.

The assembly can include bayonet connection means between the container flange and the container door, the container flange being configured to be connected to the cell flange, via a bayonet connection and the container door being configured to be connected to the cell door via a bayonet connection, the container flange including on its radially internal periphery interior lugs extending radially inwards and separated by notches, and the container door including on its radially external periphery lugs extending radially outwards separated by notches, the container door including a first abutment set comprising at least one abutment element for an interior lug of the container flange in a direction of rotation of the container flange in a connection phase of the connecting assembly to the cell, and a second abutment set separate from the first abutment set, including at least one abutment element, for an interior lug of the container flange in a direction of rotation of the container flange in a disconnection phase of the connecting assembly to the cell.

Preferably, the first abutment set includes the same number of abutment elements as the number of interior lugs, and the second abutment set includes the same number of abutment elements as the number of interior lugs.

In an example, the lugs of the container door have an angular extension equal to twice the angular extension of the interior lugs.

According to an additional characteristic, each abutment element of the first abutment set is located at a lateral end of a lug of the container door, and each abutment element of the second abutment set is located at an equal distance from the two lateral ends of a lug of the container door.

According to another additional characteristic, each abutment element is formed by a pin parallel to the axis of the container door.

According to a preferred embodiment, the container door is configured to be connected with the cell door via a bayonet connection implementing three lugs.

The container flange can be configured to be connected with the cell flange via a bayonet connection implementing three lugs.

The object of the present application is also a fluidtight transfer container including a connecting assembly according to the invention and a container fastened to the container flange.

The container can be fastened to the second connection portion by welding or by means of clamping.

The object of the present application is also a fluidtight transfer installation including a cell comprising a cell flange, a cell door, means for locking the cell door on the cell flange, and a fluidtight transfer container according to the invention.

The cell can advantageously include an inner chute movable in such a way that a first longitudinal end of the inner chute bears against the shoulder. Advantageously, the first longitudinal end of the inner chute includes an annular seal intended to come into contact with the shoulder.

According to an additional characteristic, the first longitudinal end of the inner chute has an inner diameter close to or equal to the inner diameter of the second longitudinal portion in such a way that, when the inner chute is bearing against the shoulder, a conduit having a substantially smooth inner surface is created.

The bayonet connection between the container door and the cell door can implement three lugs.

The bayonet connection between the container flange and the cell flange can implement three lugs.

Advantageously, the installation includes a motorised control of the locking means.

BRIEF DESCRIPTION OF THE DRAWINGS

The present invention shall be better understood based on the following description and of the accompanying drawings wherein:

FIG. 13A, FIG. 13B, FIG. 13C and FIG. 13D are container side views of the different connection steps of the assembly of FIG. 10A to a cell.

FIG. 14A, FIG. 14B, and FIG. 14C are front views of a cell flange and cell door according to other embodiments.

DETAILED DISCLOSURE OF PARTICULAR EMBODIMENTS

In the following description, the expressions "cell door" and "alpha door" are synonyms, the expressions "container door" and "beta door" are synonyms, the expressions "cell flange" and "alpha flange" are synonyms and the expressions "container flange" and "beta flange" are synonyms.

Figure 1:
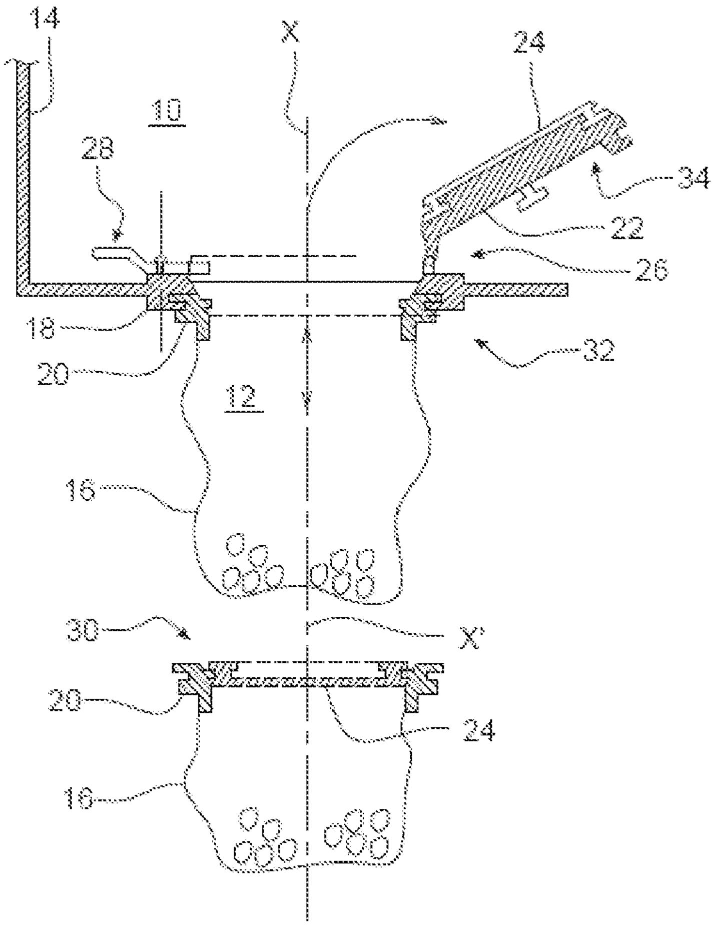
FIG. 1 is a longitudinal cross-section view schematically showing the connection of a transfer container on a cell by means of a double-door fluidtight transfer device by means of the bayonet type.

In FIG. 1, a schematic representation of a double-door fluidtight transfer system can be seen wherein a transfer container according to the invention can be implemented.

In general the double-door transfer system has a symmetry of revolution about the axis X which is the axis of the cell flange In the following description the two closed volumes that are sought to be connected correspond respectively to an isolator 10 or cell and to a container 12. In this example, the container includes a flexible container portion.

The cell 10 is delimited by a wall 14 of which only a portion can be seen in FIG. 1. It can be provided for example with remote means of manipulation such as remote manipulators and/or gloves (not shown) engaged with the wall 14. The container 12 is also delimited by a wall 16, as shown in particular in FIG. 1. The wall 16 is formed by a flexible bag, for example obtained by welding via their edges two pieces of films, for example of rectangular shape. The bag includes an opening fastened in a fluidtight manner to a flange.

The double-door fluidtight transfer device mainly comprises a cell flange 18, a container flange 20 provided with a seal 25, a cell door 22 provided with a seal 82 normally closing off a circular opening delimited by the cell flange 18, and a container door 24 normally closing off an opening delimited by the container flange 20. The cell flange 18 and the container flange 20 are fastened respectively on the wall 14 of the cell 10 and on the wall 16 of the container 12. In this example, the cell door 22 is articulated on the cell flange 18 via a hinge 26.

Means designated generally by the reference 28, make it possible to control the opening and the closing of the doors 22 and 24.

The fastening of the container door 24 on the container flange 20 is provided by a bayonet connection, in order to allow for the engagement of the container flange 20 on the cell flange 18 and the engagement of the container door 24 on the cell door 22, the double-door fluidtight transfer system also comprises two other bayonet connections. The three bayonet connections are arranged in such a way that after the coming alongside of the container flange 20 on the cell flange 18, a rotation of the container 12 about its axis, for example in the clockwise direction, has the effect of engaging the container flange 20 and the cell flange 18, engaging the container door 24 and the cell door 22, and disengaging the container door 24 from the container flange 20. In an operating mode, the latter two operations are carried out consecutively, in such a way that the opening of the container occurs only after the container door 24 has been engaged with the cell door 22 to form a double door.

The assembly formed by the cell flange and the cell door is commonly designated as the "alpha portion".

The assembly formed by the container flange 20, the door of the container 24 and the seal 25 mounted on the flange, and which provides both the seal between the flange and the container door 24 and between the cell flange 18 and the container flange 20, is commonly designated as the "beta portion".

The transfer container then includes a beta connection portion and a container that is flexible in this example. The beta connection portion will also be designated as the connecting assembly.

The connecting assembly includes the container flange 20 and the container door 24. The container is engaged in a fluidtight manner with the flange for example by welding or by mechanical means, for example by a clamping collar in the case of a flexible container.

Figure 2A:
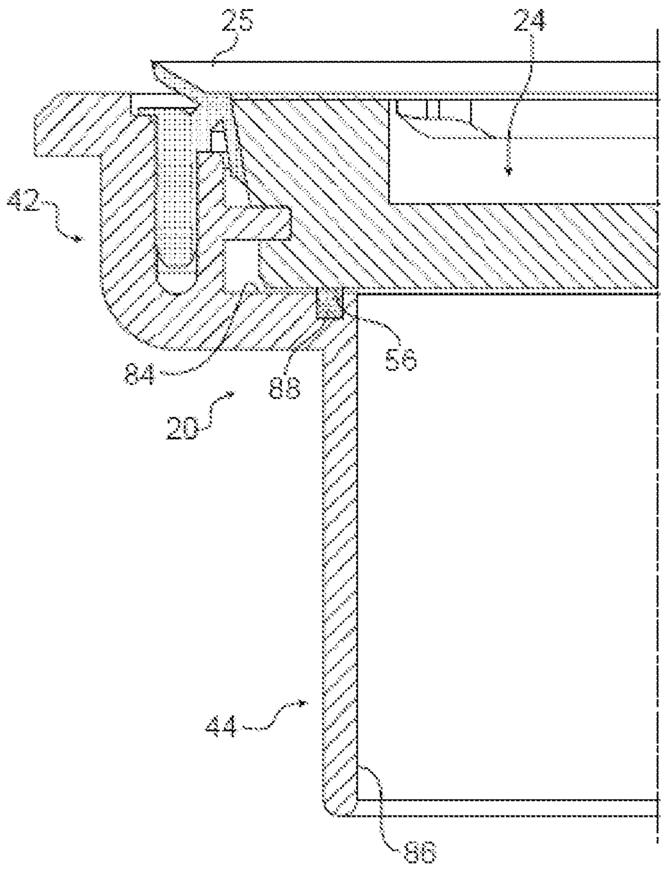
FIG. 2A is a longitudinal cross-section view of an example of a connecting assembly.

In FIG. 2A, an example of a container flange 20 according to the invention can be seen. The body of the flange 20 includes a shoulder 84 connecting the first longitudinal connection portion 42 and the second longitudinal connection portion 44 to the container.

The second face 56 of the door 24 is opposite the shoulder. The second longitudinal portion 44 of tubular shape and the shoulder 84 exteriorly border the second longitudinal end.

The second longitudinal portion 44 forms an integrated chute 86. The term "chute" refers to an element for example tubular or partially formed by a portion of a tube and delimitating a flow path that provides the guiding of the objects.

The shoulder 84 and the chute 86 are intended to cooperate very advantageously with an inner chute with the cell in order to ensure the pouring of objects.

Figure 2B:
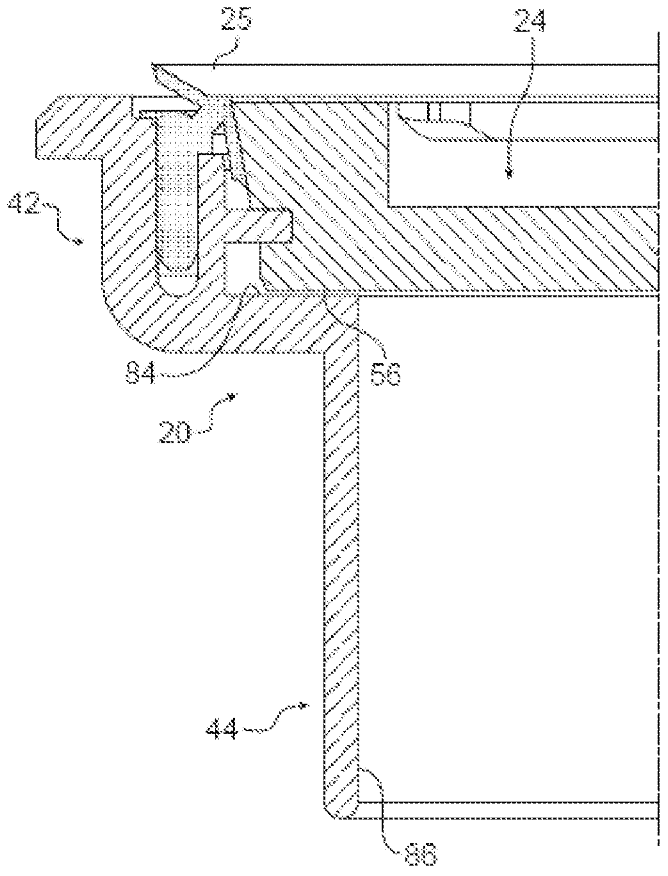
FIG. 2B is a longitudinal cross-section view of an alternative of the assembly of FIG. 2A.

In FIG. 2B, another example of a container flange 20 according to the invention can be seen. Very advantageously, an annular seal 88 is disposed on the shoulder 84. In this example, when the door 24 is mounted in the flange 20, the face 56 of the door 24 is in contact with the seal 88. The function of the seal 88 is to provide the fluidtightness, on the one hand, between the flange 20 and the door 24 and, on the other hand, between the flange 20 and an inner chute with the cell.

Figure 2C:
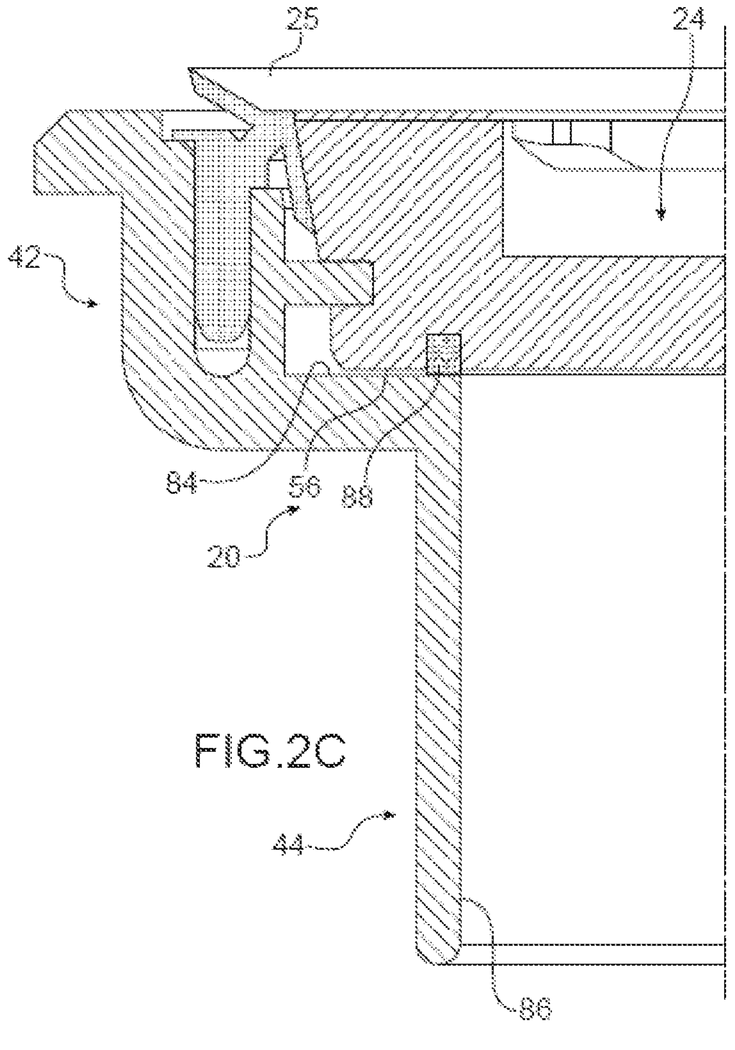
FIG. 2C is a longitudinal cross-section view of another alternative of the assembly of FIG. 2A.
Figure 2D:
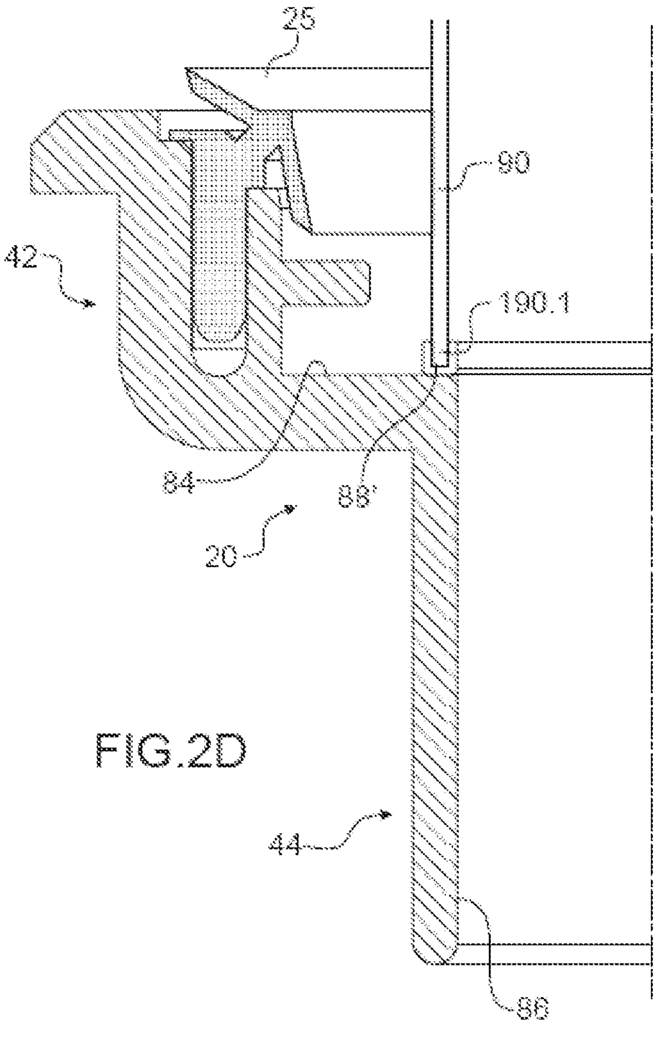
FIG. 2D is a longitudinal cross-section view of another alternative of FIG. 2A.

Advantageously, the seal 88, placed in the shoulder of the flange 20, protects the inner volume of the container 12 from particles caused by the friction between the door and the container flange. Alternatively and according to FIG. 2C, the seal 88 can be placed on the face 56 of the door 24 to provide this fluidtightness. The fluidtightness between the flange 20 and the inner chute with the cell is then carried out in this alternative by adding a seal 88' on the inner chute, such as shown in FIG. 2D.

The flange 20 separates the connection portion to the cell from the container portion, thus it makes it possible to protect the ring of contamination, designated as the "ring of concern", able to be polluted.

An example of operation shall now be described.

The container is connected to the cell such as was described hereinabove, the passage between the cell and the container is open.

Figure 3:
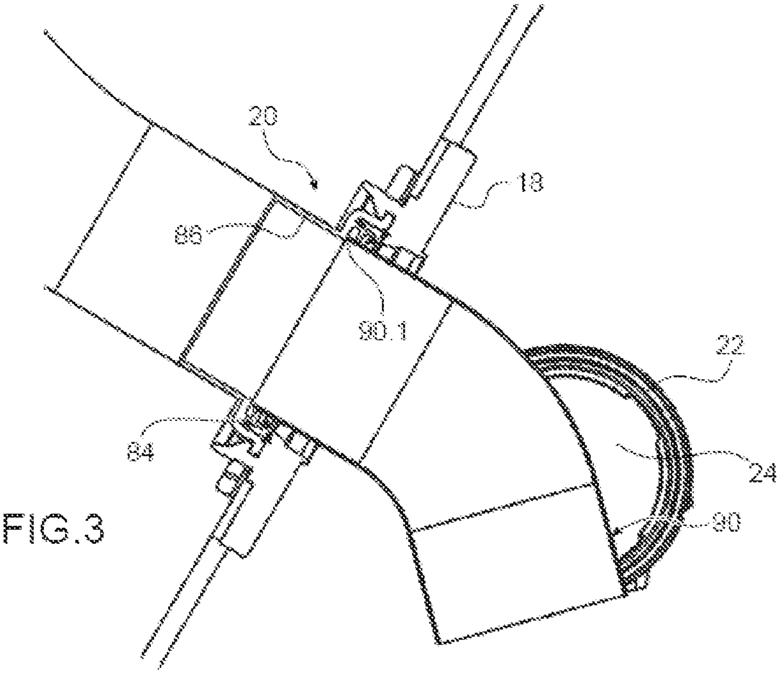
FIG. 3 is a side view of the connecting assembly connected to a cell and alongside an inner chute.

An inner chute 90 (FIGS. 2D and 3) located in the cell is set in place in the flange 20 in such a way that one of its longitudinal ends 90.1 bears against the seal 88 or that the seal 88 carried by the chute 90 comes into contact with the shoulder 84. The presence of the seal 88 provides a fluidtightness between the flange 20 and the inner chute and makes it possible to transfer powder.

Very advantageously, the inner diameter of the inner chute 90 is close to or equal to the inner diameter of the shoulder 84. Thus a flow path having a substantially smooth inner surface is arranged between the inner chute 90 and the integrated chute 86 of the flange 20, limiting, or even avoiding any risk of jamming of objects flowing between the container and the cell. The term "substantially smooth inner surface" means an inner surface that has little or no variation in transversal dimension or then a continuous variation in transversal dimension not creating any obstacle to the flow of an object.

The flange 20 makes it possible to avoid deploying a sleeve in the isolator to protect the objects transferred from the ring of contamination, designated as the "ring of concern". The manual operations from the inside of the isolator and the presence of the glove required to deploy the sleeve are removed. The flange 20 is then particularly adapted to installations with automatic door opening without manual intervention, i.e. without unlocking of the cell door from the inside by an operator. A motorised system can then be implemented to control the locking and the unlocking of the door of the cell.

In the examples of FIGS. 2A to 2D, the integrated chute has a cylindrical shape with a circular section and a constant diameter and is coaxial to the end portion of the inner chute bearing against the shoulder 84.

In FIGS. 4 to 9B, other example of an integrated chute are shown.

Figure 4:
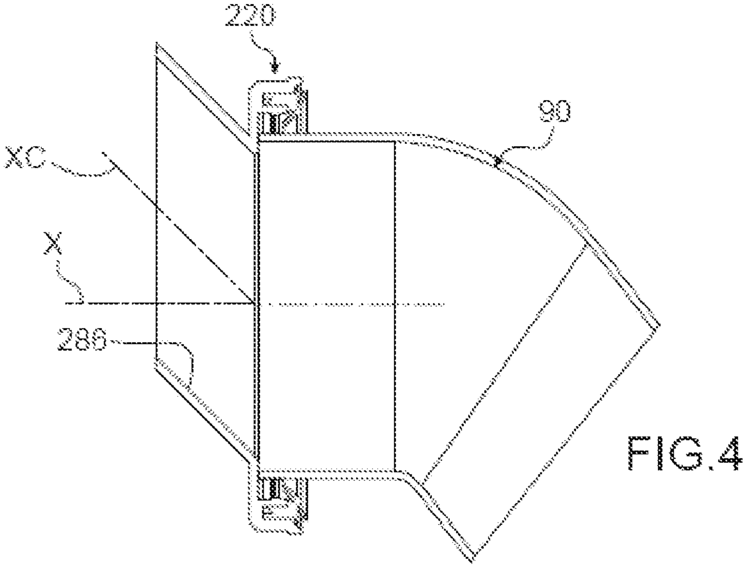
FIG. 4 is a longitudinal cross-section view of an alternative of the flange of FIG. 2A.

In FIG. 4, the flange 220 includes an integrated chute 286, of which the axis XC is inclined in relation to the axis of the first connection portion of the flange.

Figure 5A:
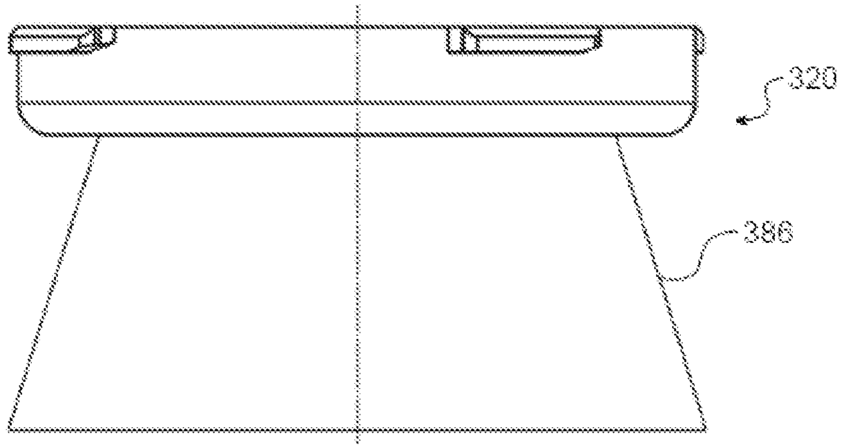
FIG. 5A and FIG. 5B are side views of alternatives of the flange of FIG. 2A.
Figure 5B:
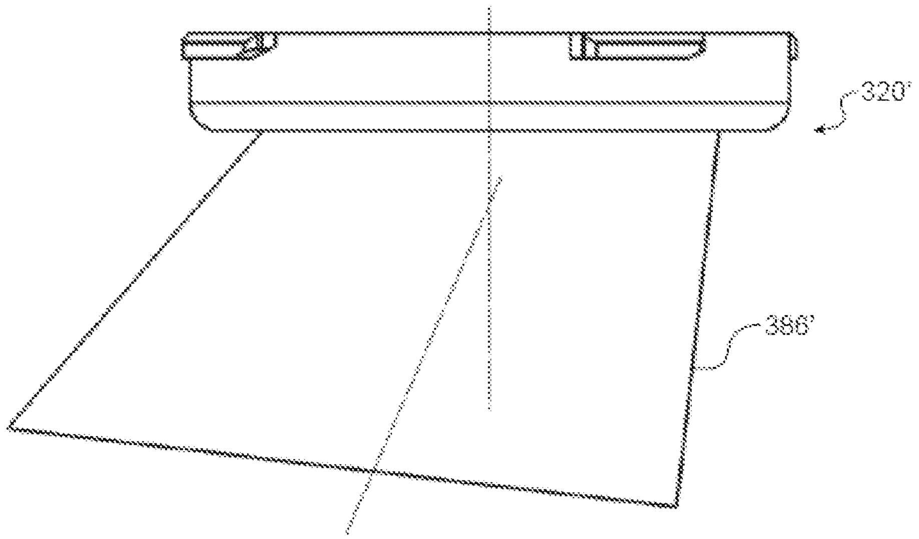

In FIGS. 5A and 5B, the flange 320, 320' includes an integrated chute 386, 386' respectively in the shape of a funnel, i.e. a truncated shape with a small base oriented on the side of the flange and having a diameter equal to the opening of the flange.

In FIG. 5A, the axis of the truncated cone is coaxial to that of the flange.

In FIG. 5B, the axis of the truncated cone is inclined with respect to that of the flange.

Figure 6A:
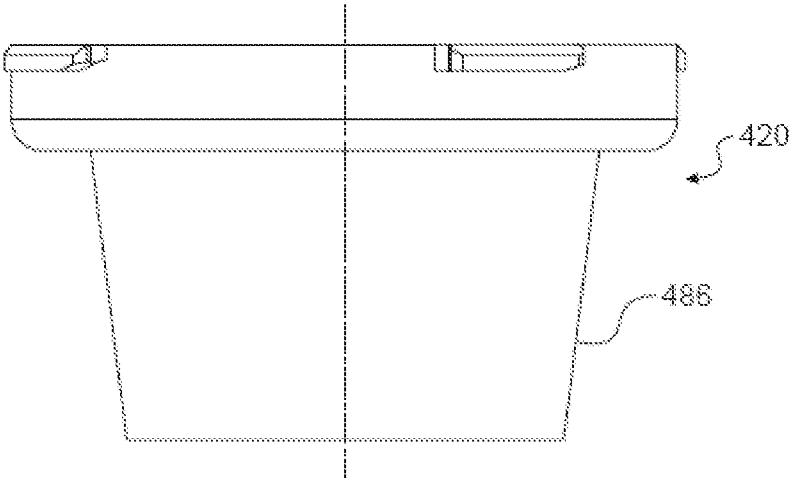
FIG. 6A and FIG. 6B are side views of alternatives of the flange of FIG. 2A.
Figure 6B:
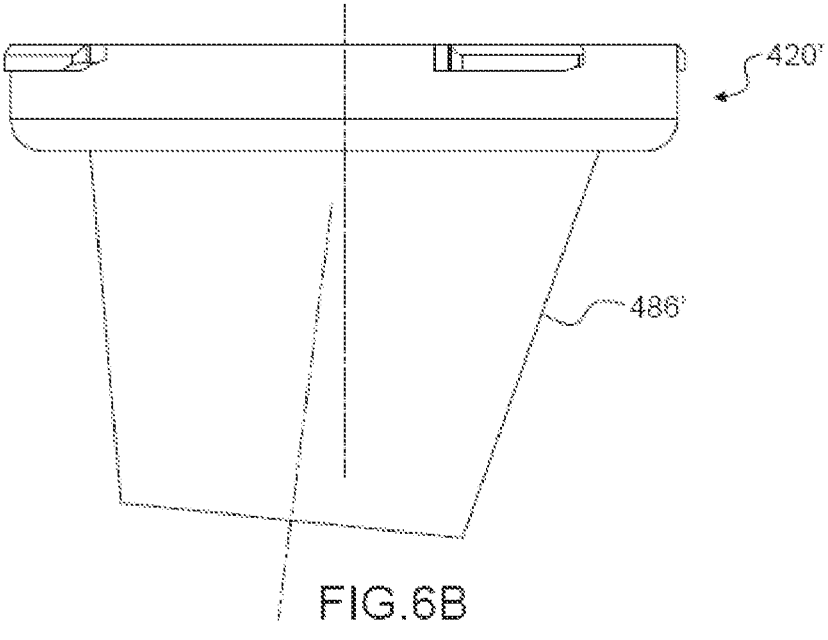

In FIGS. 6A and 6B, the flange 420, 420' includes an integrated chute 486, 486' respectively having a truncated shape with a large base oriented on the side of the flange and having a diameter equal to the opening of the flange.

In FIG. 6A, the axis of the truncated cone is coaxial to that of the flange.

In FIG. 6B, the axis of the truncated cone is inclined with respect to that of the flange.

Figure 7:
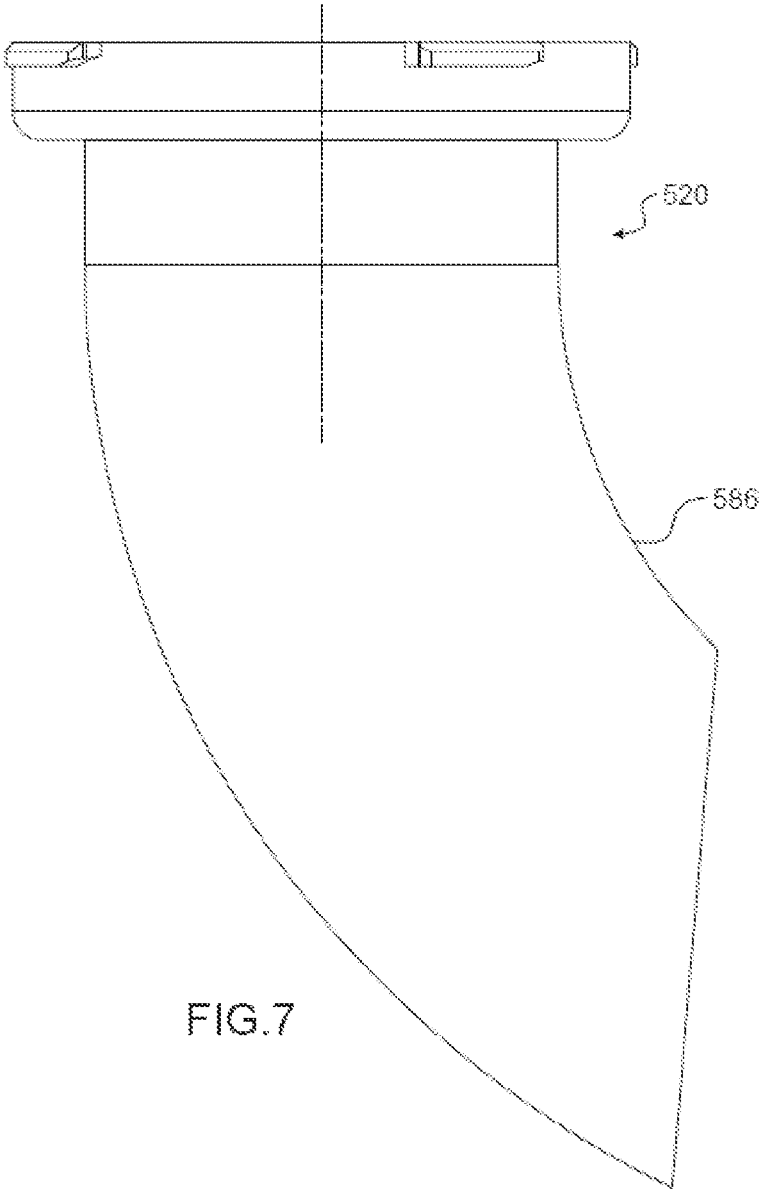
FIG. 7 is a side view of an alternative of the flange of FIG. 2A.

In FIG. 7, the flange 520 includes an integrated chute 586 having a curved shape, for example an elbow shape. The end of the integrated chute connected to the flange has a diameter equal to that of the opening of the flange.

Figure 8A:
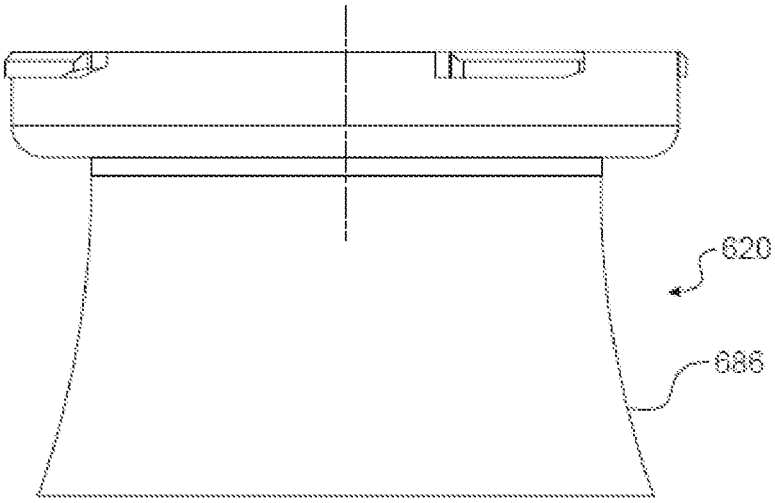
FIG. 8A and FIG. 8B are side views of alternatives of the flange of FIG. 2A.
Figure 8B:
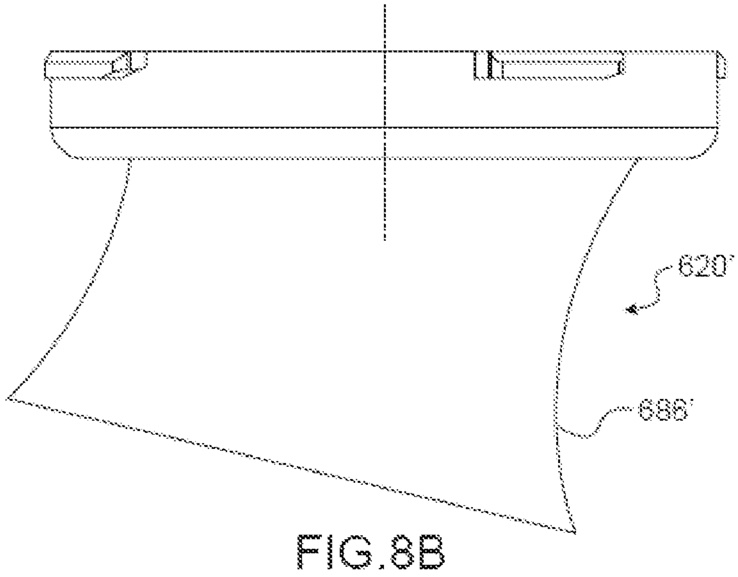

In FIGS. 8A and 8B, the flange includes an integrated chute 620, 620' having a substantially truncated shape of which the lateral wall is concave, and with a small base oriented on the side of the flange and having a diameter equal to the opening of the flange.

In FIG. 8A, the axis of the integrated chute is coaxial to that of the flange.

In FIG. 8B, the axis of the integrated chute is inclined with respect to that of the flange.

Figure 9B:
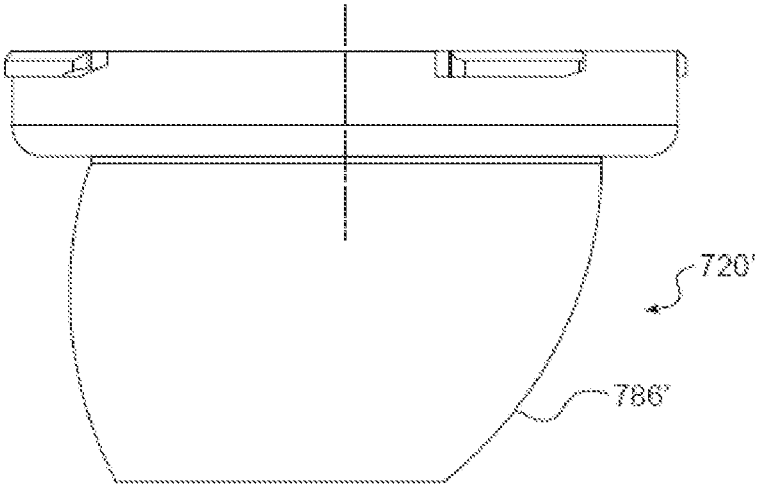
FIG. 9A and FIG. 9B are side views of alternatives of the flange of FIG. 2A.
Figure 9A:
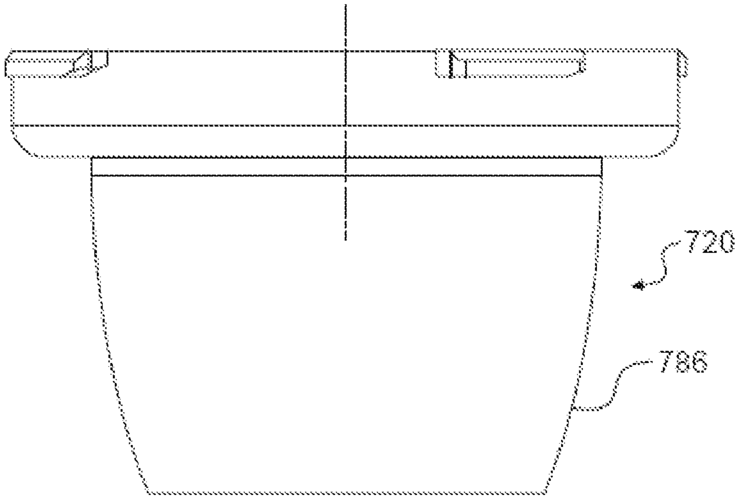

In FIGS. 9A and 9B, the flange 720, 720' includes an integrated chute 786, 786' respectively having a substantially truncated shape of which the lateral wall is convex, with a large base oriented on the side of the flange and having a diameter equal to the opening of the flange.

In FIG. 9A, the axis of the inner chute is coaxial to that of the flange.

In FIG. 9B, the axis of the inner chute is inclined with respect to that of the flange.

In FIGS. 10A, 10B, 11, 12A and 12B, an example of a connecting assembly can be seen.

The flange 120 includes a body with a substantially tubular shape with a longitudinal axis X' comprising a first longitudinal connection portion 42 to an alpha portion of a cell cellule and a second longitudinal connection portion 44 to the flexible container. A longitudinal passage is delimited through the two longitudinal portions. The first longitudinal connection portion 42 is configured to be closed off by the door 24. A container with a rigid container does not leave the scope of the present invention.

The first connection portion 42 includes on its radially external periphery lugs 46, designated as exterior lugs, intended to cooperate with the alpha flange 18 to form a bayonet connection. The exterior lugs 46 are regularly angularly distributed. In the example shown, there are four exterior lugs 46. Advantageously the arrangement and the shape of the exterior lugs 46 are similar or identical to those of the beta portions of existing containers, thus allowing for interchangeability of the containers and even the replacing of the existing containers with the containers according to the present invention without a hindrance for the user.

The first connection portion 42 includes connection means cooperating with the door 24. The connection means are of the bayonet type. They include lugs 52, designated as interior lugs, four in the example shown, radially protruding inwards. The interior lugs 52 are angularly distributed regularly about the axis X'. In this example, each interior lug 52 has an angular extension of 30°, relatively reduced with respect to the interior lugs of the beta portions of the prior art, making it possible to increase the section of passage through the flange.

In the example shown, each interior lug 52 is aligned with an exterior lug along a radius.

The flange 120, as well as the door 24, are advantageously made of a plastic material, for example of high-density polyethylene (HDPE), of low-density polyethylene (LDPE), of polyvinyl chloride (PVC), of polysulphone (PSU), of polycarbonate (PC), of polypropylene (PP), of cyclic olefin copolymer (COC), of polyetherimide (PEI), of poly(ethylene terephthalate) (PET), of polybutylene terephthalate (PBT), of polyoxymethylene (POM), of polyetheretherketone (PEEK), of polytetrafluoroethylene (PTFE), of a mixture of polymethyl methacrylate (PMMA)/acrylonitrile butadiene styrene (ABS), of polystyrene (PS), of acrylonitrile butadiene styrene (ABS) or of styrene-acrylonitrile copolymer (SAN). The flange can be advantageously obtained directly by injection. Indeed the reduced angular dimensions of the interior lugs 52 facilitate the injection moulding because they limit the size of the undercuts, and therefore the width of the slides to be implemented in the mould.

Figure 12A:
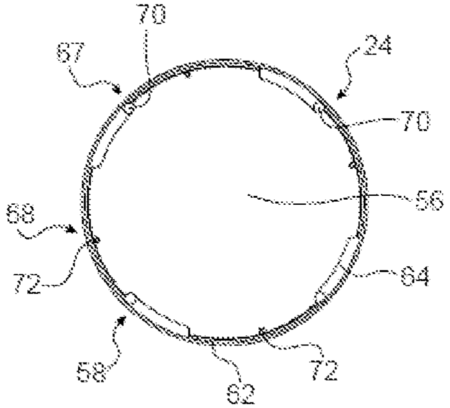
FIG. 12A is a view of the inner face of the door for the transfer container of FIG. 10A shown alone.
Figure 12B:
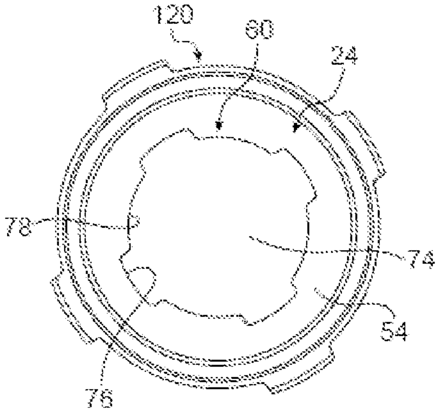
FIG. 12B is an outside view of a flange, door and seal connecting assembly for the transfer container of FIG. 10A.

In FIGS. 12A and 12B, a top view of an embodiment of the door 24 can be seen. The door 24 has the shape of a disc. It includes a body provided with a first face 54 intended to be disposed outside the container and opposite the alpha door 22 and a second face 56 intended to be disposed inside the container. The two faces 54, 56 are connected by an edge 57.

The door includes, on its second face 56, connection means 58 configured to cooperate with the interior lugs 52 of the flange 120, and on its first face 54 connection means 60 to the cell door 22.

Figure 12C:
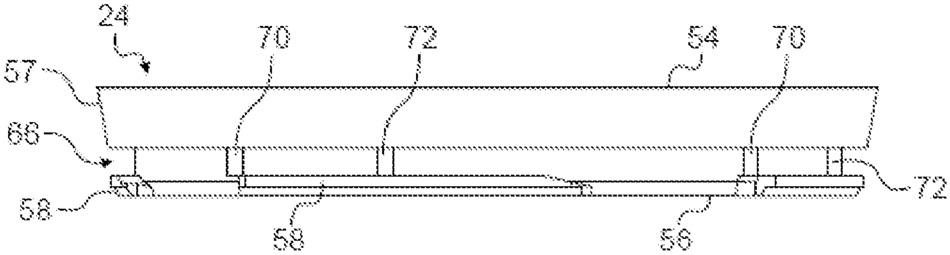
FIG. 12C is a side view of the door of FIG. 12A.

The connection means 58 include, on the radially exterior periphery of the disc, lugs 62 separated two-by-two by a notch 64. The door includes an annular groove 66 (FIG. 12C) formed in the edge 57 and connecting the notches 64 together. The body of the door then comprises a plateau 59 and lugs.

The lugs and the notches are angularly distributed regularly about the axis of the door 24.

The notches have an angular extension of about 30° in order to allow for the mounting of the interior lugs of the flange and the lugs have an angular extension of 60°. An angular play, for example of about 5°, is provided in order to allow for the mounting of the lugs in the notches for the bayonet connection.

Furthermore, the door 24 includes a first abutment set 67, referred to as a connection set, intended to allow the engagement in rotation of the container door 24 and of the cell door 22 over a portion of the rotation of the flange 120 during the connection of the container with the alpha portion. The door 24 also includes a second abutment set 68, referred to as a disconnection set, intended to allow the engagement in rotation of the flange 120 and of the door 24 over a portion of the rotation of the flange during the disconnection of the container from the alpha portion.

In the embodiment, the connection abutment set 67 includes four abutment elements 70, each abutment element 70 being intended to cooperate with a first lateral end 52.1 of an interior lug 52 of the flange 120.

Each abutment element 70 is positioned at a lateral end of a lug of the door 24, and the abutment elements 70 are disposed in relation to one another in such a way as to be uniformly angularly distributed. They are separated from one another by an angle of 90°. In this example, the abutment elements 70 are formed by pins, for example metal pins, mounted parallel to the axis of the door and passing through a lug, the groove and the plateau. The pins can be mounted in the door after the manufacture of the latter.

Alternatively, the abutment elements 70 are directly formed with the body of the door, for example during the moulding by thermoplastic injection.

Alternatively, one, two or three abutment elements 70 are implemented. However a larger number of abutment elements makes it possible to distribute the force, limiting the risks of deteriorating the flange.

In the embodiment, the disconnection abutment set 68 includes four abutment elements 72, each abutment element 72 being intended to cooperate with a second lateral end 52.2 of an interior lug 52 of the flange 120.

Each abutment element 72 is positioned in a central zone of a lug 62 of the door and the abutment elements 72 are disposed with respect to one another in such a way as to be uniformly angularly distributed. They are separated from each other by an angle of 90°. In this example, the abutment elements 72 are formed by pins, for example metal pins, mounted parallel to the axis of the door and passing through a lug, the groove and the plateau. The pins can be mounted in the door after the manufacture of the latter.

Alternatively, the abutment elements 72 are directly formed with the body of the door, for example during the moulding by thermoplastic injection.

As for the abutment elements 70, one, two or three abutment elements 72 can be implemented. However a larger number of abutment elements makes it possible to distribute the force, limiting the risks of deteriorating the flange.

The angle α between abutment elements 72 of the disconnection set in relation to the abutment elements 70 of the connection set is chosen, such that the angular displacement of the value of this angle provides in the connection phase, the disconnection between the flange 120 and the door 24, and the connection between the door of the container 24 and the cell door 22. The angular displacement of the value of this angle α provides in the disconnection phase the connection of the container door 24 and of the container flange 120, and the disconnection of the door of the container 24 and of the door of the cell 22.

In the example shown, the interior lugs of beta flanges 52 have an angular extension of 30°, the lugs of the beta door 62 have an angular extension of 60° and the notches between the lugs 64 have an angular extension of 30° in order to house the interior lugs 52 without counting the mounting angular play.

The angle α between an abutment element 70 and an abutment element 72 intended to come into contact with the first lateral edge 52.1 and the second lateral edge 52.2 of the same interior lug of the flange 120 is equal to 60°.

The number and the relative angular position of the abutment elements are chosen according to the number of interior lugs and angular extensions of the different elements participating in the bayonet connections between the container door and the flange and between the container door and the cell door.

The connection means 60 between the door 24 and the cell door 22 include a hollow imprint of circular shape 74, provided on its external periphery, with notches 76 extending radially outwards and intended for receive the lugs of the cell door. An annular groove 78 centred on the axis of the door connects the notches and houses the lugs of the cell door.

The cell door 22 includes protruding from its face located outside the cell a protruding disc provided on its external periphery with lugs 80 extending radially outwards and intended to be received in the notches 76 of the container door 24, and to cooperate with the groove 78 in order to ensure the immobilisation of the two doors with respect to one another in the longitudinal direction. The annular seal 82 is provided on the outer face of the cell door 22, intended to come into contact with the face of the container door and to ensure the fluidtightness between the two faces of the doors 22, 24.

The flange 120 has a cleared passage and the realisation thereof is simplified. Adding an additional abutment set to the container door does not complicate or hardly complicates the manufacture thereof.

The connection and disconnection cycles between a container including the connecting assembly according to the invention and a cell shall now be described.

Figure 10A:
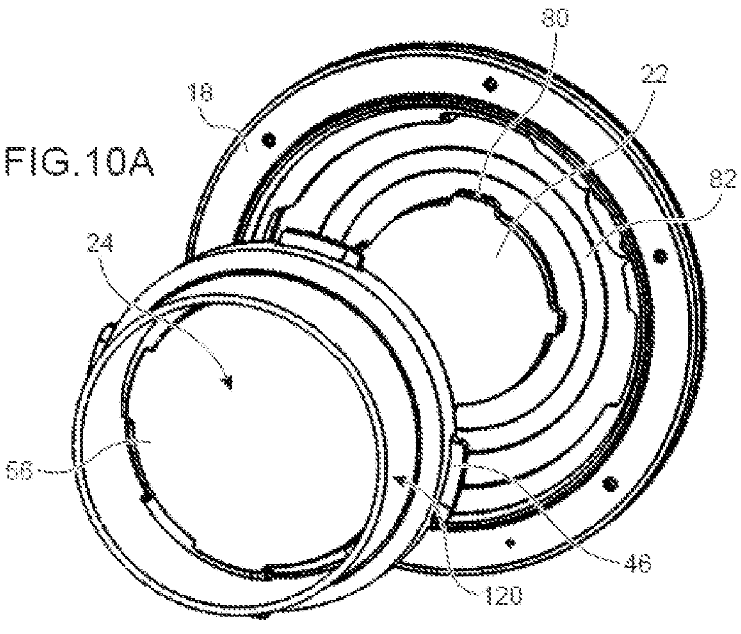
FIG. 10A is a perspective view of another example of a flange, door and seal connecting assembly for a transfer container and of a cell flange and door seen from the outside.
Figure 10B:
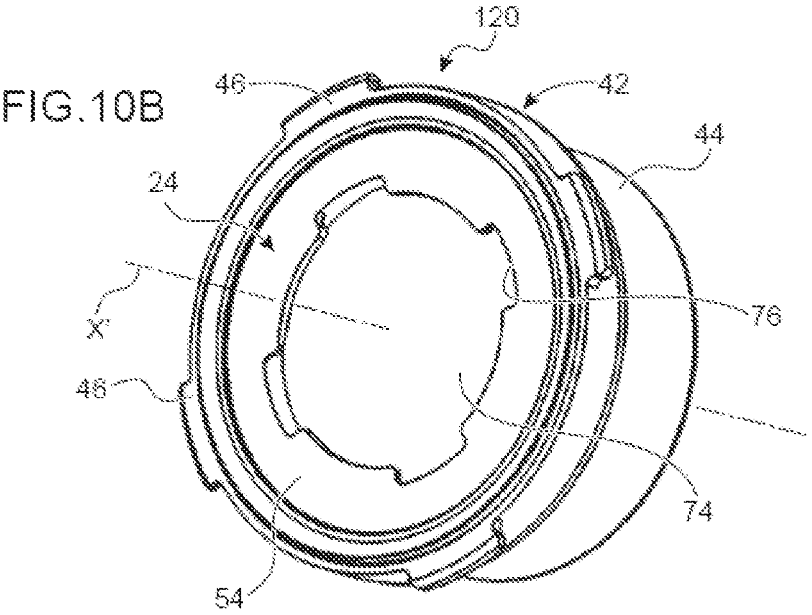
FIG. 10B is a perspective view of the connecting assembly for the transfer container of FIG. 10A.
Figure 11:
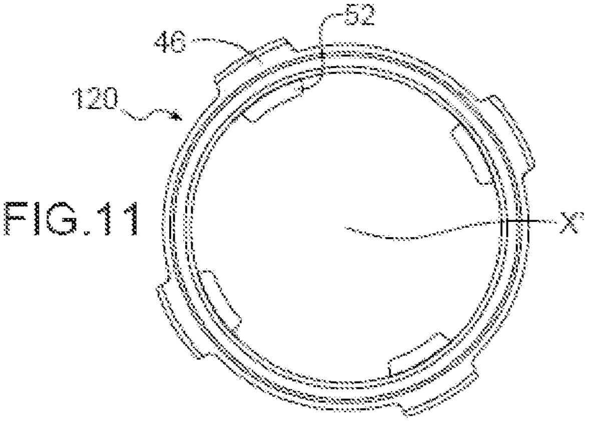
FIG. 11 is a top view of the flange for the transfer container of FIG. 10A shown alone.
Figure 13A:
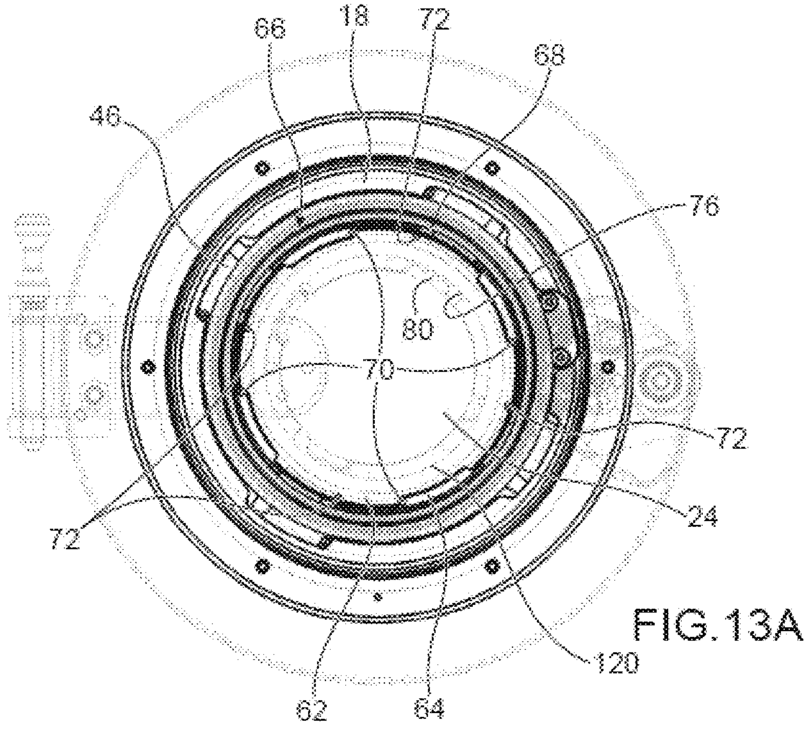
Figure 13B:
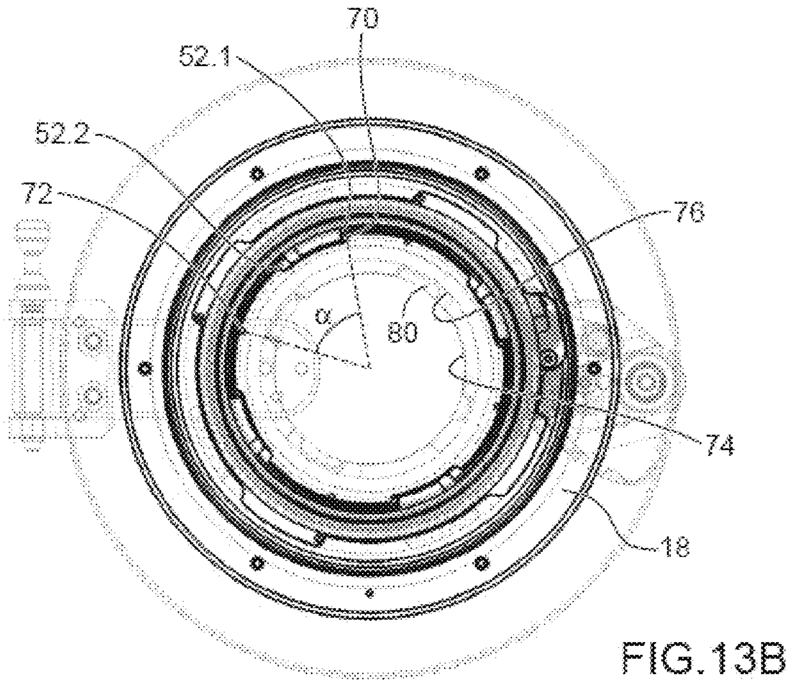

An example of a fluidtight connection cycle shall now be described:

The container is brought closer to the cell flange and the cell door, the exterior lugs 46 of the flange 120 penetrate into the notches of the cell flange 18, and the lugs 80 of cell door 22 penetrate into notches 76 of the container door 24 (FIGS. 10A and 13A). The container is pivoted, in a clockwise direction, the exterior lugs 46 also pivot and slide in a groove of the cell flange 18. Simultaneously, due to the friction between the doors of the container and of the cell, the container door 24 is maintained immobile in rotation with respect to the flange 120, the interior lugs 52 slide with respect to the container door 24 and are positioned facing notches 64 of the door 24, the flange 120 and the door 24 are then disconnected (FIG. 13B). Moreover, each interior lug 52 of the flange 120 bears, by its first lateral edge 52.1, against an abutment element 70 of the connection set carried by the door 24.

Figure 13C:
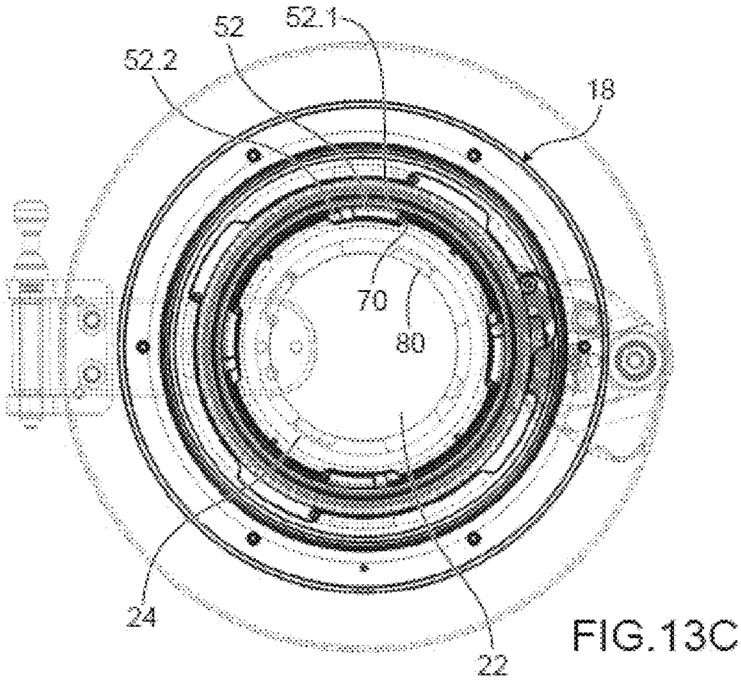

The container is again pivoted, due to the bearing of the interior lugs 52 of the flange 120 against the abutment elements 70, the rotation of the container causes the rotation of the door 24, which causes the relative rotation of the doors 24 and 22, and the connection between the doors by the bayonet connection 60. The two doors are then engaged longitudinally and in fluidtight contact (FIG. 13C).

The order of the sequences of the connection cycle described hereinabove can be modified according to the friction forces between the seal carried by the container flange and the other carried by the cell door. The connection cycle can be as follows. Simultaneously, due to the friction of the seal carried by the container flange, the rotation of the container causes the rotation of the container door 24, which causes the connection between the container door 24 and the cell door 22 by the bayonet connection. The two doors 24, 22 are then engaged. Each lug of the container door 24 then bears against a circumferential abutment carried by the cell door.

The container is again pivoted, due to the bearing of the lugs of the container door 24 against the circumferential abutments on the cell door 22, the rotation of the container causes the disconnection between the container door 24 and the container flange 120.

From the inside of the cell, the locking means 28 are controlled to unlock the cell door 22 and the assembly of the two doors can be pivoted towards the inside of the cell about the axis of the hinge 26 (FIG. 13D).

The transfer between the two volumes can take place. Due to the passage cleared through the flange 120, the risks of object jamming are substantially reduced.

An example of a disconnection cycle is as follows:

The assembly of the two doors 22, 24 is set in place in the flanges.

The container is rotated in the anticlockwise direction. Due to the friction between the doors, the door 24 remains immobile in rotation, which causes the connection of the door 24 and the flange 120, and the interior lugs 52 bear against the abutment elements 72 by their second lateral edge 52.2. The rotation of the container continues, causing the relative rotation of the doors 22, 24 and the disconnection of the two doors 22, 24. The container is also disconnected from the cell flange 18. The container can then be removed from the flange.

The order of the sequences of the disconnection cycle described hereinabove can be modified according to the friction forces between the seal carried by the container flange and the other carried by the cell door. The two doors 22, 24 are disconnected from one another, and then the container door 24 is connected to the container flange 120.

It will be understood that other values of angular extension can be considered. The value of angular extension is chosen to ensure sufficient mechanical resistance.

The connecting assembly described hereinabove also has the advantage of being able to be connected to an existing alpha portion without requiring adaptation.

Figure 15A:
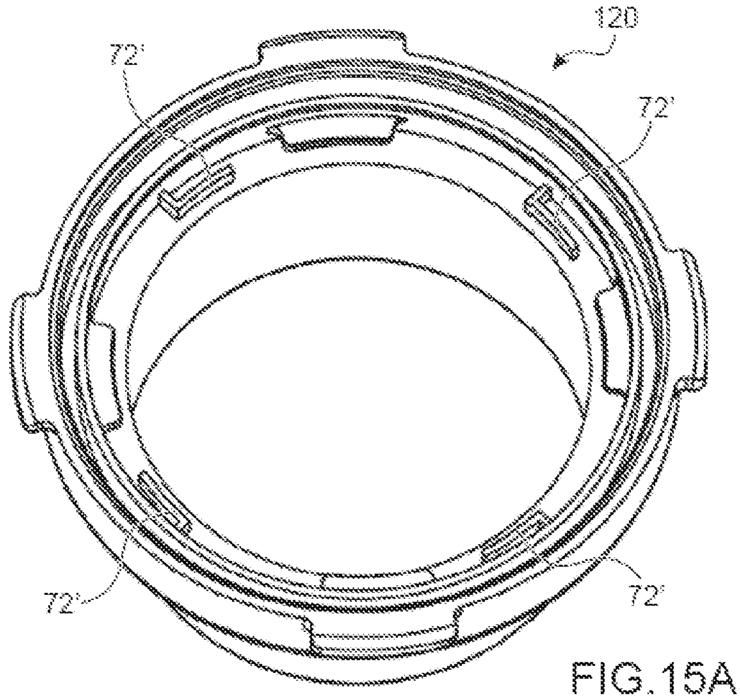
FIG. 15A is a perspective view of an alternative for the flange of the connecting assembly of FIG. 10A.
Figure 15B:
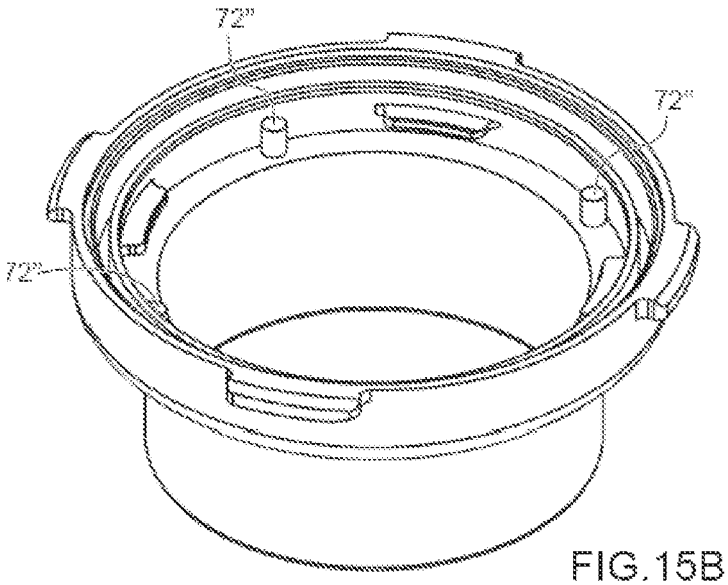
FIG. 15B is a perspective view of another alternative for the flange of the connecting assembly of FIG. 10A.

According to the alternative shown in FIG. 15A, the disconnection abutment set is carried out on the flange 120, the abutment elements 72' of this set are not formed by an interior end of lugs but by separate and discrete elements. Thus the flange includes lugs of reduced angular extension, for example 30° instead of 60° allowing for a facilitated injection moulding. The abutment elements can be carried out in a single piece with the flange for example by moulding but as these elements are of simple shape and reduced dimensions, they do not complicate the injection moulding. According to another alternative shown in FIG. 15B, the abutment elements 72" of the disconnection set are carried out by metal pins added onto the flange.

The angle $\alpha$ of 60° is respected. These alternatives dissociate the functions of mechanical resistance provided by the lugs and of stopping in rotation provided by the abutments during the connection cycle.

The bayonet connection between the container door 24 and the container flange 20 can be a bayonet connection wherein the abutments are distributed between the door and the flange or a bayonet connection of the type of that described in relation with FIGS. 10A to 13D.

According to another example, the flange 20 and the door 24 can be modified to be connected to an alpha portion by means other than a bayonet connection.

Figure 14B:
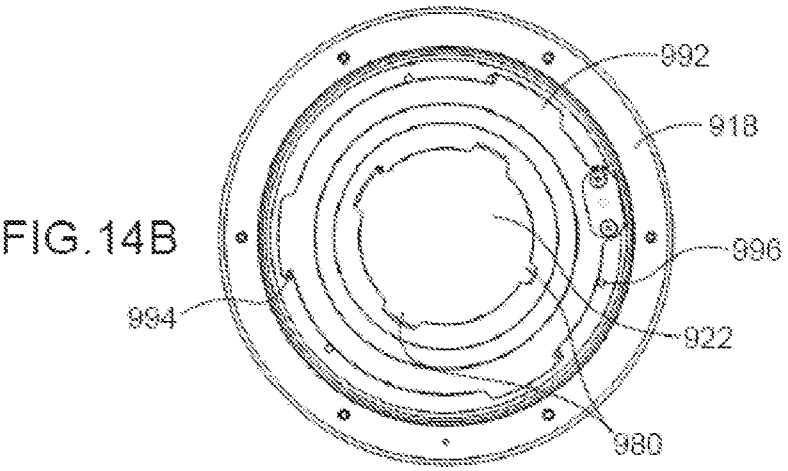
Figure 14C:
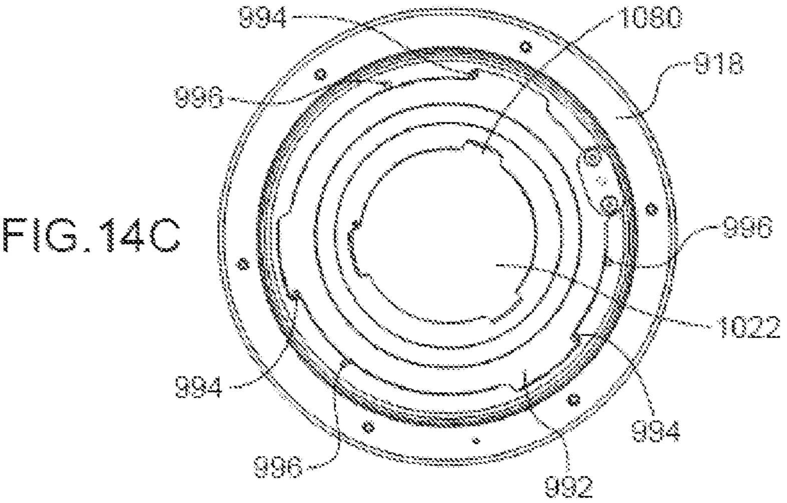

In FIGS. 14A to 14C, examples of the alpha portion that have a reduced connection hyperstatism can be seen.

In FIG. 14A, the cell door 822 includes three lugs 880. This results in that the container door is modified, the imprint on its outer face then includes three notches for housing the three lugs of the cell door. This connection advantageously has a reduced hyperstatism, providing a homogeneous compression of seals, which is favourable to the fluidtightness between the two doors. The other elements of the alpha and beta portions are unchanged, such as the bayonet connection with four lugs between the two flanges or the bayonet connection with four lugs between the container flange and the container door.

Figure 16A:
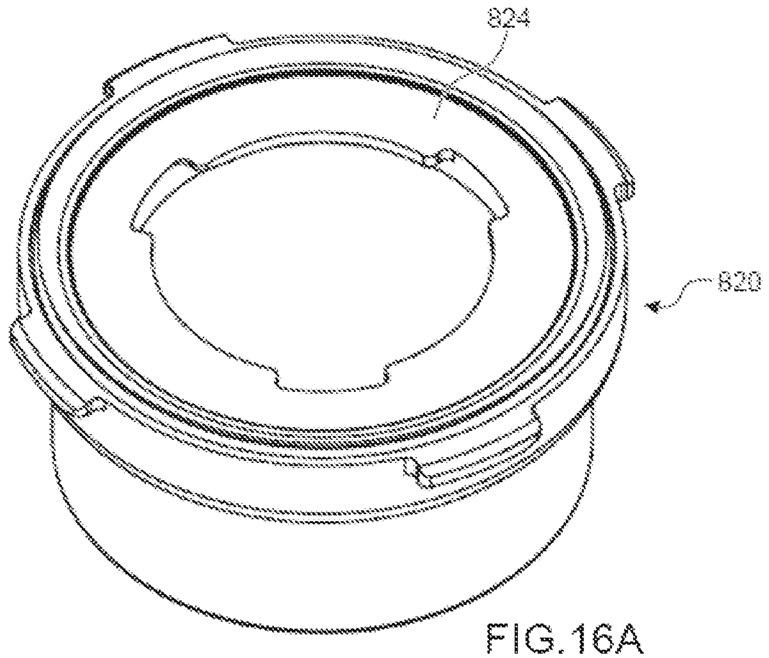
FIG. 16A is a perspective view of a connecting assembly configured to be connected to the cell flange and to the cell door of FIG. 14A.

This realisation makes it possible to very easily adapt the existing installations to containers of which the door has an imprint with three notches by replacing the cell doors without having to replace the cell flange. Likewise the existing containers provided with their flange can be adapted by replacing only the container door. In FIG. 16A, a container flange 820 and the container door 824 can be seen adapted to be connected to the alpha portion of FIG. 14A.

The connection between the flange 820 and the door 824 can be carried out by four lugs or by three lugs.

In FIG. 14B, an alpha portion can be seen wherein the flange 918 includes three connection notches 992 with the beta flange and the cell door 922 includes four lugs 980. The hyperstatism of the connection between the cell flange and the container flange is reduced, which is favourable to the fluidtightness between the two.

In this example, the cell flange can be modified to include three lugs.

Figure 16B:
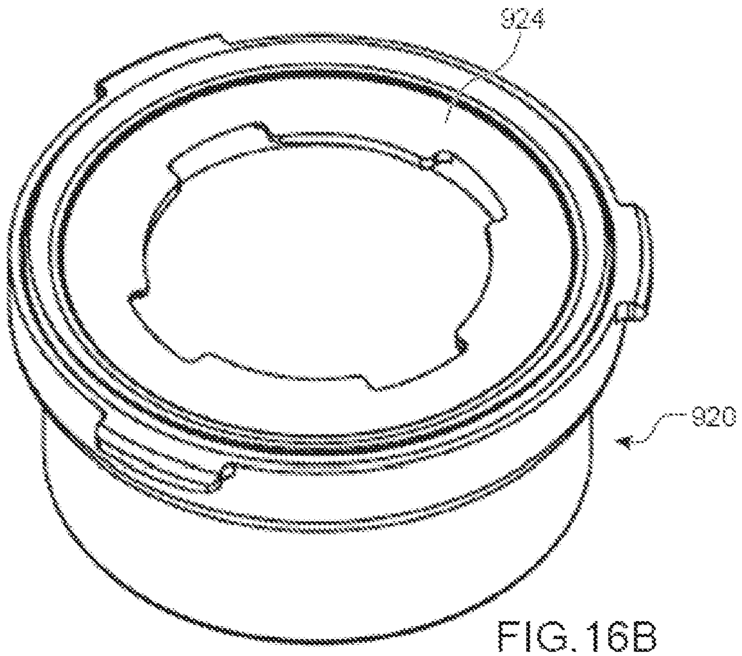
FIG. 16B is a perspective view of a connecting assembly configured to be connected to the cell flange and to the cell door of FIG. 14B.

In FIG. 16B, a container flange 920 and the container door 924 can be seen adapted to be connected to the alpha portion of FIG. 14B. The connection between the flange 920 and the door 924 can be carried out by four lugs or by three lugs.

In FIG. 14C, the cell flange 918 includes three connection lugs 992 with the beta flange and the cell door 1022 includes three lugs 1080. In this example both the hyperstatism of the connection between the cell flange and the container flange and the hyperstatism of the connection between the cell door and the container door are reduced.

Figure 16C:
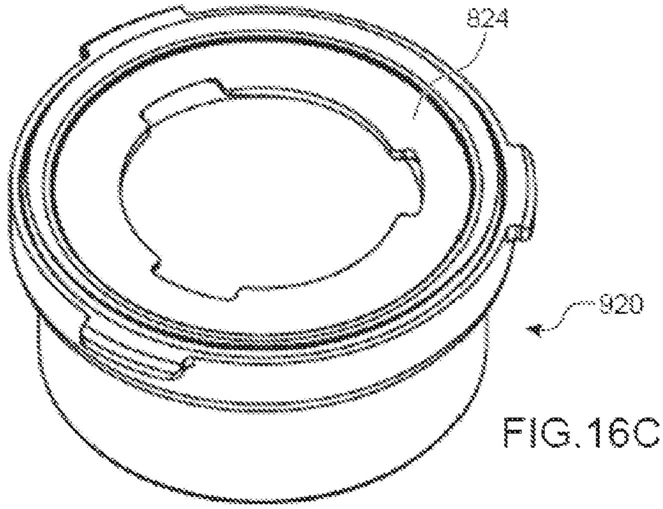
FIG. 16C is a perspective view of a connecting assembly configured to be connected to the cell flange and to the cell door of FIG. 14C.

In FIG. 16C, a beta portion can be seen adapted to be connected to the alpha portion of FIG. 14C, and comprised of the container flange 920 and of the container door 824. The connection between the flange 920 and the door 824 can be carried out by four lugs or by three lugs.

In the examples of FIGS. 14B and 14C, implementing cell flanges with three notches, an additional abutment set is added in order to allow for the disconnection. Indeed, when the cell flange includes four notches, the same abutment set can be used for the connection and the disconnection, for example by choosing four lugs each extending over 30° and a connection movement over 60°.

In the examples of FIGS. 14B and 14C, by choosing lugs extending over 30° also, they are separated by 120°. However the connection movement and the disconnection movement extend over 60°. In FIGS. 14B and 14C, a first connection abutment set 994 can be seen including three abutment elements located on a lateral edge of the lugs and a second disconnection abutment set 994 including three abutment elements located at 30° from the abutment elements of the first set upstream of the latter in the direction of connection.

Alternatively, it can be provided to carry out lugs extending over 40° and separated by an angle of 80°, the connection and disconnection movement are then done on an angular course of 80°. A single abutment set can then be implemented.

Figure 17A:
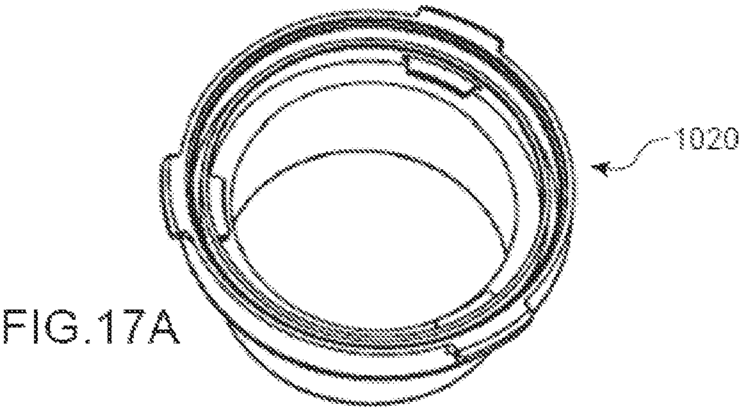
FIG. 17A is a perspective view of a flange with three exterior lugs and three interior lugs.
Figure 17B:
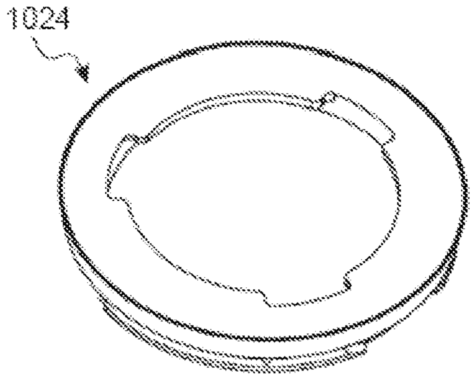
FIG. 17B and FIG. 17C shows perspective views of the outer and inner faces respectively of a container door adapted to be connected to the flange of FIG. 17A.
Figure 17C:
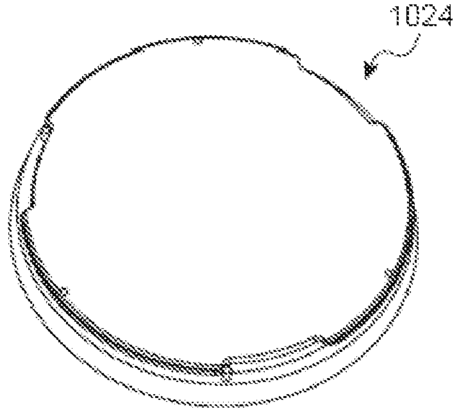

In FIG. 17A, a container flange 1020 including three interior lugs and three exterior lugs can be seen, and in FIGS. 17B and 17C a container door 1024 adapted to be connected onto the flange 1020 can be seen. The flange 1020 and door 1024 assembly is adapted to be connected onto the alpha portion of FIG. 14C.

What is claimed is:

1. A connecting assembly for a transfer container configured to realize a fluidtight transfer with a cell including a cell flange comprising notches and a cell door provided on its external periphery with first lugs, said connecting assembly including a container flange including on its periphery lugs configured to cooperate with the notches of cell flange to form a bayonet connection with a container door mounted in the container flange and that is provided on its external periphery with notches configured for receive the first lugs, wherein the container flange includes a first longitudinal connection portion to the cell and a second longitudinal connection portion to a container, the first longitudinal connection portion and the second longitudinal connection portion being connected by a shoulder oriented towards the container door.

2. The connecting assembly according to claim 1, wherein the second longitudinal connection portion forms a chute integrated into the container flange.

3. The connecting assembly according to claim 1, including an annular seal between the shoulder and a face of the container door opposite the shoulder.

4. The connecting assembly according to claim 1, including a first and a second bayonet connection between the container flange and the container door, wherein the container flange is configured to be connected to the cell flange via the first bayonet connection and the container door is configured to be connected to the cell door via the second bayonet connection, wherein the container flange includes on its radially internal periphery interior lugs extending radially inwards and separated by notches, and the container door includes on its radially external periphery lugs extending radially outwards separated by notches, wherein the container door includes a first abutment set comprising at least one abutment element for an interior lug of the container flange in a direction of rotation of the container flange in a connection phase of the connecting assembly to the cell, and a second abutment set separate from the first abutment set, including at least one abutment element, for an interior lug of the container flange in a direction of rotation of the container flange in a disconnection phase of the connecting assembly to the cell.

5. The connecting assembly according to claim 4, wherein the first abutment set includes a same number of abutment elements as a number of interior lugs, and the second abutment set includes a same number of abutment elements as a number of interior lugs.

6. The connecting assembly according to claim 4, wherein the lugs of the container door have an angular extension equal to twice the angular extension of the interior lugs.

7. The connecting assembly according to claim 4, wherein each abutment element of the first abutment set is located at a lateral end of a lug of the container door, and each abutment element of the second abutment set is located at an equal distance from the lateral ends of a lug of the container door.

8. The connecting assembly according to claim 4, wherein each abutment element is formed by a pin parallel to an axis of the container door.

9. The connecting assembly according to claim 1, wherein the container door is configured to be connected with the cell door via a bayonet connection implementing three lugs.

10. The connecting assembly according to claim 1, wherein the container flange is configured to be connected with the cell flange via a bayonet connection implementing three lugs.

11. A fluidtight transfer container including a connecting assembly for a transfer container configured to realize a fluidtight transfer with a cell including a cell flange comprising notches and a cell door provided on its external periphery with first lugs, said connecting assembly including a container flange including on its periphery lugs configured to cooperate with the notches of cell flange to form a bayonet connection with a container door mounted in the container flange and that is provided on its external periphery with notches configured for receive the first lugs, wherein the container flange includes a first longitudinal connection portion to the cell and a second longitudinal connection portion to a container, the first longitudinal connection portion and the second longitudinal connection portion being connected by a shoulder oriented towards the container door, and a container fastened to the container flange.

12. The fluidtight transfer container according to claim 11, wherein the container is fastened to the second longitudinal connection portion by welding or by clamping.

13. A fluidtight transfer installation including a cell comprising a cell flange, a cell door, a lock configured to lock the cell door on the cell flange, and a fluidtight transfer container including a connecting assembly for a transfer container configured to realize a fluidtight transfer with a cell including a cell flange comprising notches and a cell door provided on its external periphery with first lugs, said connecting assembly including a container flange including on its periphery lugs configured to cooperate with the notches of cell flange to form a bayonet connection with a container door mounted in the container flange and that is provided on its external periphery with notches configured for receive the first lugs, wherein the container flange includes a first longitudinal connection portion to the cell and a second longitudinal connection portion to a container, the first longitudinal connection portion and the second longitudinal connection portion being connected by a shoulder oriented towards the container door.

14. The fluidtight transfer installation according to claim 13, wherein the cell includes an inner chute movable in such a way that a first longitudinal end of the inner chute bears against the shoulder.

15. The fluidtight transfer installation according to claim 14, wherein the first longitudinal end of the inner chute includes an annular seal adapted to come into contact with the shoulder.

16. The fluidtight transfer installation according to claim 14, wherein the first longitudinal end of the inner chute has an inner diameter close to or equal to the inner diameter of the second longitudinal connection portion in such a way that when the inner chute is bearing against the shoulder, a conduit having a substantially smooth inner surface is created.

17. The fluidtight transfer installation according to claim 13, wherein the container door is configured to be connected with the cell door via a bayonet connection implementing three lugs and the bayonet connection between the container door and the cell door implements three lugs.

18. The fluidtight transfer installation according to claim 13, wherein the container flange is configured to be connected with the cell flange via a bayonet connection implementing three lugs and the bayonet connection between the container flange and the cell flange implements three lugs.

19. The fluidtight transfer installation according to claim 13, including a motorised control of the lock.

* * * * *